May 17, 1966  C. E. WEBBE  3,251,612
CONNECTOR ASSEMBLY
Filed July 9, 1965  3 Sheets-Sheet 1

INVENTOR
Charles E. Webbe
BY
Pennie, Edmonds, Morton, Barrows & Taylor
ATTORNEYS May 17, 1966 C. E. WEBBE 3,251,612
CONNECTOR ASSEMBLY
Filed July 9, 1965 3 Sheets-Sheet 2

INVENTOR
CHARLES E. WEBBE
BY
ATTORNEYS

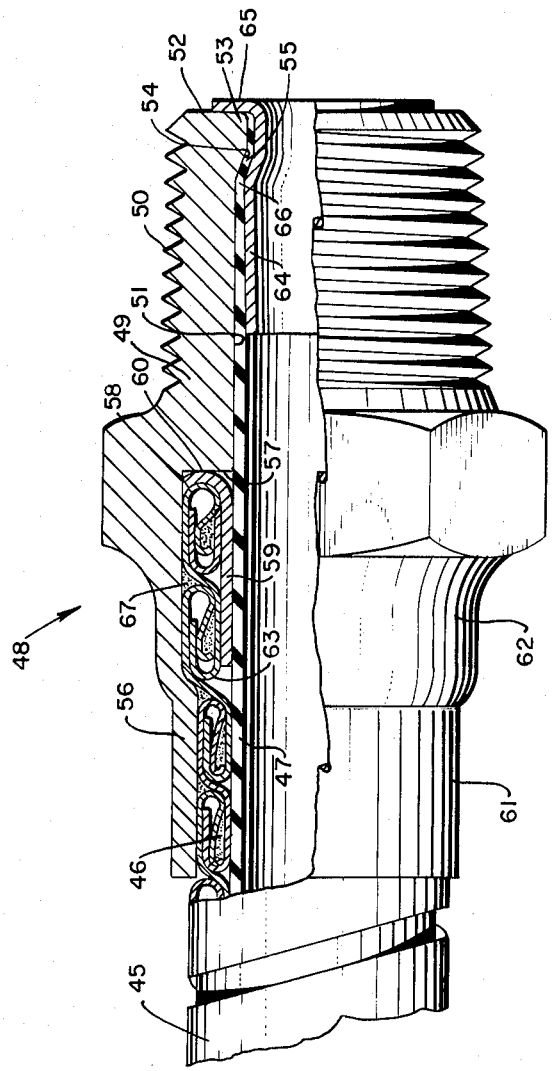

# United States Patent Office 3,251,612
Patented May 17, 1966

3,251,612
CONNECTOR ASSEMBLY
Charles E. Webbe, Waterbury, Conn., assignor to Anaconda American Brass Company, a corporation of Connecticut
Filed July 9, 1965, Ser. No. 473,901
9 Claims. (Cl. 285—47)

This is a continuation-in-part of my application Serial No. 202,650, filed June 12, 1962 now abandoned, which in turn is a continuation-in-part of my application Serial No. 124,510, filed July 17, 1961, now abandoned.

This invention relates to a flexible connector assembly for fluids, and more particularly to a connector assembly of this type which is substantiallly impervious to fluid leakage even under intense thermal conditions.

It is often desirable in the installation of different types of apparatus which must be permanently connected to a fluid source, to make the connection in a manner which will allow limited mobility of the apparatus. The obvious solution to this problem and the one which has heretofore been proposed is simply to link the apparatus to the fluid source by means of a metallic hose. The metal hose which previously has been employed in such connectors, has been of the seamless type construction. This seamless construction is advantageous in that it ordinarily will not permit fluid leakage under even the most intense thermal conditions. But, the nature of this seamless construction is such that is most cases it does not possess the strength and ruggedness desired. When these conventional seamless metal hose connectors were employed, they initially provided adequate protection against failure from the intense heat of a nearby fire, however, after continued shifting and moving of the apparatus, which such connectors are designed to permit, these seamless connectors were often weakened physically, cracked and eventually leaked.

I have found a novel construction for such a connector wherein the connector is strong enough to withstand extensive abuse in the form of twisting, bending, and stretching forces, and yet remains substantially impervious to fluid leakage even under intense thermal conditions. In my flexible connector I employ a length of strip-wound flexible metal hose having a plastic lining disposed within the metal hose. (By "plastic lining" I mean any rubber, synthetic rubber, organic material, or the like which is capable of being deformed continuously in most any direction without rupture and is substantially impervious to chemical attack by the fluid being conveyed.) I have particularly found that a liner formed of butyl rubber or polytetrafluoroethylene offers definite advantages. A strip-wound metal hose of this type will withstand almost unlimited flexing without structural failure and allows extensive flexibility. However, the plastic liner will ordinarily be destroyed at temperatures of the order expected during a fire. For this reason a thermal resistant packing is preferably disposed within the interlocked convolutions of the strip-wound length of hose. To further prevent failure of the assembly at the respective ends of the hose, an end fitting is affixed to the respective end portions and compacts the lining under pressure between the fitting and the hose, to provide a substantially fluid-tight connection. To prevent thermal failure at the end connection, a thermal resistant gasket is securely held between the fitting and the hose. This thermal resistant gasket preferably extends between adjacent convolutions underlying the gasket, or alternatively, a deposit of thermal resistant sealing could be included therebetween. This connector is a substantial improvement over connectors formerly used in that it is stronger, more rugged and thereby can withstand considerably more flexing than connectors formerly employed. Moreover, because of the strategic location of thermal resistant packings and gaskets, the connector is nevertheless substantially impervious to leakage during the course of a fire.

Accordingly, the flexible connector of the invention for the transfer of fluids comprises a length of strip-wound flexible metal hose and a plastic lining disposed within the metal hose. An end fitting is affixed to each of the respective hose end portions such that an end portion of said plastic lining is compressed against a portion of said hose fitting in substantially fluid-tight engagement with the fitting along a portion thereof separate from a thermal resistant gasket which is securely held between another portion of the fitting and the hose.

More specifically the flexible connector comprises a length of strip-wound flexible metal hose constructed of interlocked helically wound convolutions of metal strip. A thermal resistant packing is disposed within the interlocked convolutions but permits relative movement between the interlocked convolutions. An inner plastic lining extends axially within the metal hose; an end portion of said inner lining may be turned back around the respective edges of the hose and against the respective end portions thereof. An end fitting having an internal bore extending therethrough is affixed to each of the respective hose end portions. A stem portion is provided on each of the end fittings and it has an inside diameter larger than the bore. The stem portion extends circumferentially about the respective end portions of the hose and has an axial length sufficient to extend over a multiplicity of said convolutions. A thermal resistant gasket means is disposed within said stem portion and is positioned circumferentially about said hose end portions and between adjacent convolutions for substantially preventing gas leakage out of the fitting along the circumferential end portions thereof in the event of heat damage to said lining. The stem portion is radially compressed inwardly against the gasket means to hold said gasket means compressed between the stem portion and the circumferential end portion of the hose. Means are included in said assembly for compressing the end portion of said plastic lining against a portion of said hose fitting separate from the portion of the radially compressed stem which is compressed inwardly against the gasket means so that the end portions of the lining are held in fluid-tight engagement with the respective fittings along a portion thereof separate from said gasket means. It is also proposed to provide a flexible connector in which the inner lining is not turned back around the respective edges of the hose and against the respective end portions thereof. In this embodiment the means for compressing the end portion of the lining is an internal stem portion which is formed on the end fittings and extends within the end portions of the hose and is expanded radially against an end portion of the lining to compress it against an end portion of said hose in substantially fluid-tight engagement. A resilient sleeve may also be provided on the stem portion between it and said lining. A thermal resistant gasket securely held between a portion of the fitting and the hose and extending between adjacent convolutions of the interlocked strips.

It is further provided to extend the plastic lining axially beyond the ends of the metal hose to terminate axially beyond the stem portion of the fitting within a portion defining the bore thereof and as the means for compressing the end portion of the lining positioning a cylindrical member in the hose fitting axially spaced from the stem portion, with the cylindrical member being internally expanded to compress the end portion of the plastic lining between the cylindrical member and a portion of the hose fitting on portions thereof axially spaced from the radially compressed stem portion so that the end portions of the lining are held in fluid-tight engagement with the respective hose fitting.

This assembly of the invention is an improvement over prior gas line assemblies in that it is characterized by resistance to fatigue failure and to cracking under certain corrosive conditions, and still retains its resistance to failure at high temperature. Polytetrafluoroethylene is preferred as the plastic liner because it will withstand about 450° F. indefinitely and under usual domestic use the temperature does not ordinarily rise above about 350° F. The strip-wound hose, besides being flexible and an excellent container for the plastic lining, will not add to the conflagration. This proven hose assembly, when coupled with end fittings having the novel features described herein, provides an assembly excellently suited for the purposes recited.

A preferred embodiment of the invention is described hereinbelow with reference to the drawing wherein:

FIG. 4 is an enlarged longitudinal elevation partly broken away of a third embodiment fitting connection of the assembly.

Figure 1:
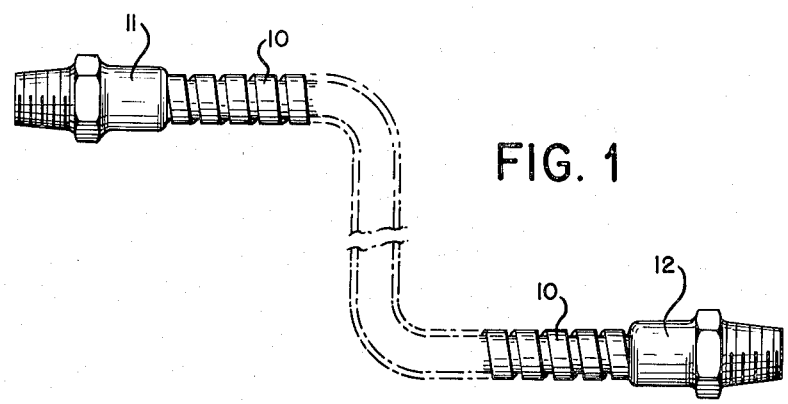
FIG. 1 is a longitudinal elevation of the entire connector assembly.

The connector assembly consists essentially of a length of metal hose 101 with end fittings 11 and 12 affixed to its opposite ends as shown in FIG. 1. The length of metal hose 10 is constructed of helically wound strip metal convolutions 14 which are interlocked to form a continuous joint. Disposed within the interlocked convolutions 14 are strips of asbestos or any other suitable thermal resistant packing 15. It is noted that the packing 15 does not in any way interfere with the relative movement between the interlocked convolutions. Fitted within the flexible hose 10 and defining the inner wall of the hose is a plastic liner 17.

Figure 2:
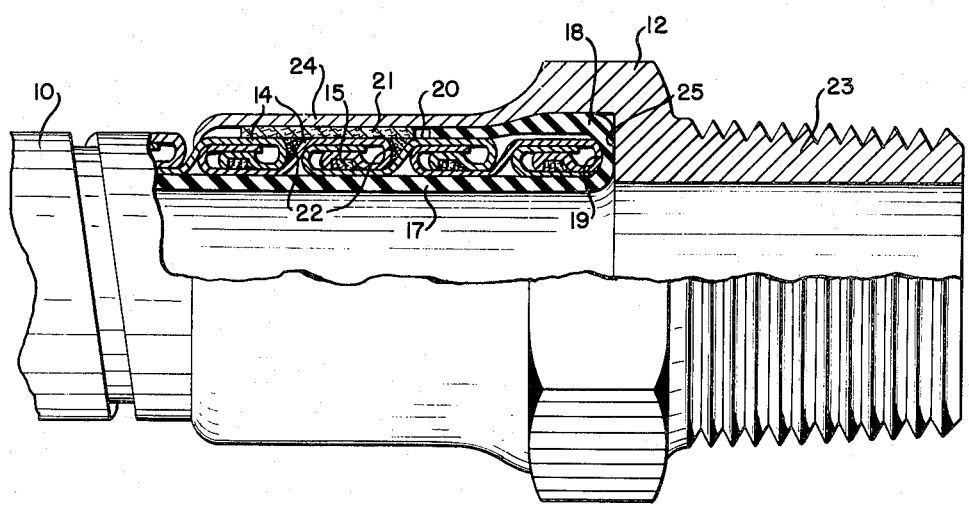
FIG. 2 is an enlarged longitudinal elevation partly broken away of the end fitting connection of the assembly.

As shown in FIG. 2, a portion 18 of the liner 17 extends outwardly beyond the edge 19 of the flexible hose 10 and is turned around the edge and back against the end portion 20 of the hose. Tightly fitted circumferentially about the end portion 20 and axially spaced from the liner portion 18 is a thermal resistant gasket 21. Asbestos is preferred as the material comprising the gasket 21 because of its thermal resistant properties. Deposited between the convolutions 14 substantially underlying the gasket 21 is a thermal resistant sealant 22. The thermal resistant sealant 22 can be a furnace cement or any suitable sealant; alternatively the gasket could be such that it would extend between the underlying convolutions and thereby eliminate the need for the sealant.

The end fitting 12 which is affixed to the end portion 20 of the hose 10 has a male threaded portion 23 with an axial bore formed therein substantially equal in diameter to the diameter of the hose 10. This portion of the fitting could, of course, be either male or female or any other suitable construction. A stem portion 24 of the fitting 12 extends in a direction opposite to that of the male portion 23 and in this embodiment has an inside diameter larger than the diameter of the bore of the male portion 23. A shoulder 25 is defined between the male portion 23 and the stem portion 24 in this embodiment by the increase in diameter. The stem portion 24 of the fitting 12 is inserted around the end portion 20 of the hose and overlies the turned-back portion 18 of the liner and the gasket 21. The shoulder 25 abuts against the liner portion 18 along the edge 19 of the hose 10. The stem portion 24 is swaged onto the end portion 20 tightly about the turned-back liner portion 18 and the insulating collar 21. The end of the stem portion 24 remote from the fitting 12 normally is tightly crimped against the underlying convolutions to insure a secure attachment. The end fitting 11 is similarly connected on the opposite end of the hose 10. It is also contemplated that the end fitting 12 could have an internal stem portion of smaller diameter than stem portion 24 and substantially co-extensive therewith. This internal stem portion could be inserted into the end portion of the hose and radially expanded to confine the lining between the inner wall of the hose and the inner stem portion of the fitting under pressure. This construction would eliminate the need for turning the inner lining around the edge 19 of the hose. Moreover, in this alternative construction, by terminating the inner lining before it reaches the edge of the hose and providing the gasket 21 and sealant 22 between the inner stem portion and the inner wall of the hose at the end portion thereof, and expanding the inner stem portion against the inner lining and the gasket, the fitting would be substantially thermal resistant. Either of these alternatives is contemplated as being within the scope of the invention. It is further to be noted that it is intended that the fitting could be affixed to the end of the hose by crimping, plastically deforming, or in any other way physically attaching the fitting to the hose such that its gasket will be compacted between the hose and the fitting under pressure.

The connector assembly described is particularly adapted for conveyance of ordinary cooking gas from its source to a stove. By incorporating a plastic liner into the hose to define the inner wall thereof, the gas will always be contained in the hose and the possibility of leaking will be eliminated. Moreover, by turning the portion 18 of the liner around the edge 19 of the hose and back against the marginal end portion 20, and swaging the stem portion 24 tightly around the liner portion 18, the end fitting 12 is also made fluid-tight. Although the plastic lining will allow safe conveyance of gases without fear of leakage under normal conditions, in case of fire the plastic liner 17 and 18 ordinarily would be destroyed and gases could readily escape from such a fitting. The connector assembly of the invention will not fail under such conditions. The thermal resistant packing 15 included between the interlocked convolutions will withstand very high temperatures and substantially prevent any fluid seepage along the length of the flexible hose 10. Furthermore, the gasket 21 is strategically positioned between the hose and fitting so that it will provide a suitable seal to the escaping gas when the plastic under 17 has been destroyed. Finally, the sealant 22 which is deposited between the convolutions 14 underlying the gasket 21 substantially prevents any gas from escaping through the helical space between adjacent convolutions.

Figure 3:
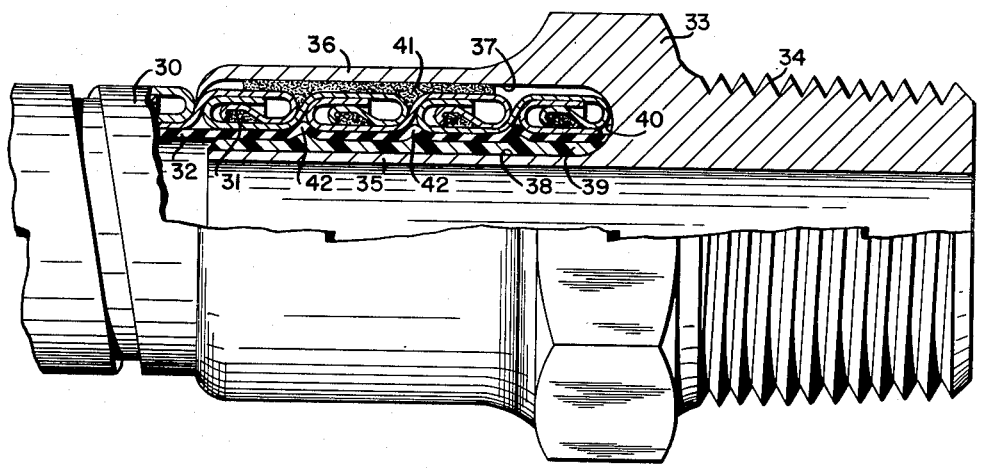
FIG. 3 is an enlarged longitudinal elevation partly broken away of a second embodiment fitting connection of the assembly.

An alternative embodiment of the type described is shown in FIG. 3. The end connector assembly consists of a length of metal hose 30 having interlocked convolutions with a thermal resistant packing 31 disposed therein in the manner described with respect to the first embodiment. Fitted within the flexible hose 30 and defining the inner wall of the hose is a polytetrafluoroethylene liner 32.

An end fitting 33 is attached to each of the respective hose end portions. The end fitting 33 has a male threaded portion 34 with an axial bore formed therein substantially equal in diameter to the inside diameter of the hose 30. An internal stem portion 35 of the fitting of which defines in part the axial bore extends in a direction opposite to that of the male portion 34. An outer stem portion 36 of greater diameter than the internal stem portion 35 also extends in a direction opposite to that of the male portion 34 and defines an annular cavity 37 therewith. Surrounding the outer circumferential surface 38 of the internal stem portion 35 is a resilient silicon rubber sleeve 39.

The hose end portion is inserted into the annular cavity 37 such that it abuts a shoulder portion 40 of the fitting which is defined by the increase in diameter between the internal stem portion 35 and the outer stem portion 36. After inserting the internal stem portion 35 into the hose end portion, it is expanded radially outwardly such that at least the outside diameter of the sleeve 39 is larger than the inside diameter of the liner 32, thereby compressing the hose end portion within the annular cavity 37 between the internal and outer stem portions 35 and 36. A thermal resistant gasket 41 is fitted circumferentially about the hose end portion and is tightly compressed between the hose end portion and the inner surface of the outer stem portion 36. The gasket 41 preferably is deposited between adjacent convolutions of the flexible hose to provide a suitable seal to escaping gas should the liner 32 be destroyed.

The use of a resilient sleeve is desirable when the plastic liner is formed of polytetrafluoroethylene. When the liner is so formed it is ordinarily of a very small thickness and very hard so that it is only by the use of a resilient sleeve formed of silicon that an effective seal can be achieved when the internal stem portion is outwardly expanded. As shown in FIG. 3, as the sleeve is compressed between the lining and the internal-stem portion, the lining is forced between the convolutions and the sleeve follows the lining at these points to form raised portions 42. It is, of course, also intended in this second embodiment that the outer stem 36 can be swaged against the hose end portion to provide an even tighter attachment thereon.

A third embodiment of an end fitting assembly is shown in FIG. 4. This assembly consists of a length of metal hose 45 having interlocked convolutions with a thermal resistant packing 46 disposed therein in the manner described with respect to the first embodiment. Fitted within the flexible hose and defining the inner wall of the hose is a polytetrafluoroethylene liner 47.

An end fitting 48 is attached to each of the respective hose end portions. The end fitting has a body portion 49 on one end of which are means for connecting the end fitting to a gas source or an appliance, the exemplary means shown being a male threaded portion 50. A generally uniform diameter bore 51 is defined in the body portion and is tapered to a smaller diameter at the endmost portion 52 of the male threaded portion to form an integral annular ring portion 53 of smaller diameter than the bore diameter. This ring portion 53 defines, by its reduction in diameter with respect to the bore 51, a shoulder surface 54 against which an endmost edge portion 55 of the liner 47 is compressed in its assembled position.

Extending axially from the body portion 49 in a direction opposite to the male threaded portion 50 is a stem portion 56 of greatly reduced cross section from the body portion and of greater inside diameter than the bore 51. A shoulder 57 is defined between the stem portion and the bore 51 by the stepped diameter relationship therebetween.

The inside diameter of the stem portion 56 is barely larger than the outside diameter of the end portion of the hose, and the stem portion can be slid onto the hose end portion with the stem portion extending over several convolutions of the hose. In assembling the end fittings on the hose, the liner 47 is extended axially beyond the end edge 58 of the hose and is cut off substantially coextensive with the endmost portion 52. Positioned between the liner 47 and a few convolutions of hose at the end thereof is a generally cylindrical rigid member 59 such as steel, which has one flanged end portion 60 turned around the end edge 58 of the hose. This flanged portion 60 becomes positioned between the shoulder 57 and the end edge 58 of the hose in assembly.

The stem portion 56 is swaged down against the hose end portion to tightly compress it therein. In this embodiment an end portion 61 of the stem portion 56 is swaged so as to substantially fully compress a few convolutions and an intermediate portion 62 in which the endmost convolutions are compressed, but not fully. There is thereby formed an annular stem portion shoulder 63 by the differences in diameter between the end portion 61 and the intermediate portion 62 which combines with the difference in sizes of the convolutions to provide a mechanical couple therebetween to prevent axial displacement of the hose from the end fitting.

Inserted into the male end of the hose fitting is a cylindrical rigid metal member 64 which has a radially extending flange portion 65 in abutment with the end edge of the male portion. This member 64 is internally expanded by a tapered expanding mandrel to compress the end portion 66 radially against the inside wall of the body defining the bore 51. The expansion of the member 64 is such that its maximum O.D. is slightly larger than the I.D. of the ring 53 adjacent the shoulder surface 54 to provide a mechanical interlock therebetween against axial displacement of the member 64 out of the hose. The remaining length of the member 64 which extends into the fitting, although expanded, gradually tapers to a smaller O.D. than its maximum O.D. In expanding the member 64, the end edge 55 of the liner tends to slip into the fitting beyond the ring 53 and becomes compressed within a cavity defined by the cylindrical member 64 and the annular ring portion 53 with the endmost edge thinned down along the shoulder surface 54, as shown.

A thermal resistant gasket 67 is fitted circumferentially about the hose end portion and the inner surface of the intermediate portion 62 of the stem portion 58 and as described in the other embodiments is preferably deposited between adjacent convolutions of the flexible hose to provide a suitable seal to gas seepage through this potential channel of escape.

The ruggedness and durability which the fluid connector of the invention possesses, has never been achieved in a fluid connector of this type before. The new connector insures a substantially trouble-free installation, which can be safely and confidently used in the home or in industry without fear of eventual failure due to wear or fire.

I claim:

1. A flexible connector assembly for the transfer of fluids which is resistant to failing under intense thermal conditions, comprising:
 (a) a length of flexible metal hose formed from interlocked helically wound convolutions of metal strip,
 (b) a thermal resistant packing disposed within the interlocked portions of the convolutions but permitting relative movement between the interlocked convolutions,
 (c) an inner plastic lining extending axially within said hose,
 (d) an end fitting affixed to each of the respective hose end portions, said end fittings having an internal bore extending therethrough,
 (e) a stem portion on each of said end fittings having an inside diameter larger than said bore and extending circumferentially about the respective end portions of said hose, said stem portion having an axial length sufficient to extend over a multiplicity of said convolutions,
 (f) thermal resistant gasket means disposed within said stem portion and positioned circumferentially about said hose end portions and between adjacent convolutions for sealing against gas leakage out of the fitting along the circumferential end portions thereof in the event of heat damage to said lining said stem portion being deformed radially inwardly against said gasket means to hold said gasket means compressed between the stem portion and the circumferential end portion of the hose, and
 (g) means in said fittings for compressing the end portions of said plastic lining against a portion of said hose fitting separate from the portion of the radially compressed stem portion which is compressed inwardly against said gasket means so that the end portions of the lining are held in fluid-tight engagement with the respective fittings along a portion thereof separate from said gasket means.

2. A flexible connector assembly as set worth in claim 1 in which an end portion of said lining is turned around the respective edges of the hose and against the respective end portions thereof, and the means for compressing the end portion thereof is a portion of said stem portion separate from the portion thereof compressing said gasket means.

3. A flexible connector assembly as set forth in claim 1 in which said means for compressing the plastic lining end portions comprises an internal stem portion in said fitting which extends within the end portions of said hose and is expanded radially outward against an inner end portion of said lining to compress it against a portion of said hose in fluid-tight engagement.

4. A flexible connector assembly as set forth in claim 3 in which a resilient circumferential sleeve is provided about said internal stem portion.

5. A flexible connector assembly as set forth in claim 1 in which said plastic liner extends axially beyond the ends of said metal hose into said bore and said means for compressing the end portions of the plastic liner comprises a cylindrical member positioned in said end fitting axially spaced from said stem portion, said cylindrical member being internally expanded to compress the end portions of the plastic lining between a portion of the cylindrical member and said hose fitting on portions thereof axially spaced from the radially compressed stem portion so that the end portions of the linear are held in fluid-tight engagement with the hose fitting.

6. A flexible connector assembly as set forth in claim 5 wherein said fitting has a annular radially inwardly projecting portion of smaller diameter than said bore defining a shoulder, and said cylindrical member being radially deformed about said annular portion to compress the end portion of the plastic liner therebetween.

7. A flexible connector assembly according to claim 6 wherein said cylindrical member has a flange portion turned around the end of the fitting opposite to the end thereof defined by said stem portion.

8. A flexible connector assembly according to claim 5 wherein a second rigid generally cylindrical member is provided in said fitting which extends within the end portion of the hose between it and the liner and has its end portion turned around the end edge of the hose and positioned between the edge of the hose and a shoulder defined by the difference in diameter between said stem portion and the bore of the fitting.

9. A flexible connector assembly for the transfer of fluids which is resistant to failing under intense thermal conditions comprising:
  (a) a length of flexible metal hose formed from interlocked helically wound convolutions of metal strip,
  (b) a thermal resistant packing disposed within the interlocked portions of the convolutions but permitting relative movement between the interlocked convolutions,
  (c) an inner plastic lining extending axially within said hose and axially beyond the end edge of the hose,
  (d) an end fitting affixed to each of the respective hose end portions, said end fitting having an internal bore extending therethrough,
  (e) a stem portion of said end fitting having an inside diameter larger than the diameter of said bore and defining a shoulder therebetween by the differences in diameter, said stem portion having an axial length sufficient to extend over a multiplicity of said convolutions, said stem portion being deformed radially inwardly against said convolutions with an end portion of the stem portion substantially fully compressing the convolutions and an intermediate stem portion partially compressing the endmost convolutions,
  (f) thermal resistant gasket means circumferentially positioned about the said hose end portion within said stem portion and between adjacent convolutions for sealing against gas leakage out of the fitting along the circumferential end portions thereof in the event of heat damage to said lining,
  (g) a cylindrical member positioned in said end fitting axially spaced from said stem portion, said cylindrical member being internally expanded to compress the end portions of the plastic lining between a portion of the cylindrical member and said hose fitting on portions thereof axially spaced from the radially compressed stem portion so that the end portions of the liner are held in fluid-tight engagement with the hose fitting,
  (h) a radially inwardly projecting portion on said fitting at the end thereof opposite to the end of the stem portion and having an internal diameter less than said bore defining a shoulder, said cylindrical member being radially deformed about said annular portion to compress the end portion of the liner therebetween, and
  (i) a second rigid generally cylindrical member extending within the end portion of the hose between it and the linear and has its end portion turned around the end edge of the hose to be positioned between the edge of the hose and a shoulder defined by the difference in diameter between said stem portion and the bore of the fitting.

References Cited by the Examiner

UNITED STATES PATENTS

| 735,735 | 8/1903 | Feust | 285—149 X |
| 956,076 | 4/1910 | Greenfield | 285—149 |
| 1,044,335 | 11/1912 | Ball | 285—149 |
| 1,808,094 | 6/1931 | Yackey | 285—149 X |

FOREIGN PATENTS

| 149,232 | 12/1952 | Australia. |
| 1,197,381 | 6/1959 | France. |

CARL W. TOMLIN, *Primary Examiner.*